United States Patent [19]

Hebert et al.

[11] Patent Number: 4,797,172

[45] Date of Patent: Jan. 10, 1989

[54] FILAMENT PREHEAT APPARATUS

[75] Inventors: Michael R. Hebert; Arnold J. Lauder, both of Winnipeg, Canada

[73] Assignee: The Boeing Company, Seattle, Wash.

[21] Appl. No.: 155,618

[22] Filed: Feb. 12, 1988

[51] Int. Cl.4 .................................... B65H 81/00
[52] U.S. Cl. ................................ 156/425; 156/497
[58] Field of Search .............. 156/195, 425, 428, 429, 156/82, 497, 499, 446, 173, 175

[56] References Cited

U.S. PATENT DOCUMENTS

| | | | |
|---|---|---|---|
| 3,042,568 | 7/1962 | Ludowici et al. | 156/137 |
| 3,077,428 | 2/1963 | Heuser et al. | 154/50 |
| 3,148,102 | 9/1964 | Eakins et al. | 156/497 X |
| 3,186,684 | 6/1965 | Takase | 253/26 |
| 3,186,694 | 6/1965 | Betts | 263/3 |
| 3,189,506 | 6/1965 | Cobb, Jr. et al. | 156/296 |
| 3,210,227 | 10/1965 | Shichman | 156/82 |
| 3,226,278 | 12/1965 | Scofield, Sr. et al. | 156/497 |
| 3,313,670 | 4/1967 | Sherwood | 156/359 |
| 3,371,188 | 2/1968 | Henes et al. | 219/373 |
| 3,400,029 | 9/1968 | Mesvobian et al. | 156/425 X |
| 3,455,765 | 7/1969 | Meyer et al. | 156/497 X |
| 3,554,504 | 1/1972 | Parkes | 263/3 |
| 3,574,015 | 4/1971 | Blee | 156/47 |
| 3,616,070 | 6/1968 | Lemelson | 156/173 X |
| 3,670,731 | 6/1972 | Harmon | 128/284 |
| 3,775,222 | 11/1973 | Aspin et al. | 156/497 |
| 3,788,917 | 1/1974 | Linda | 156/82 |
| 4,078,957 | 3/1978 | Bradt | 156/429 X |
| 4,094,725 | 6/1978 | Takeda et al. | 156/497 |
| 4,260,439 | 4/1981 | Speer | 156/98 |
| 4,322,262 | 3/1982 | Cottam | 156/392 |
| 4,366,369 | 12/1982 | Hagen et al. | 219/388 |
| 4,456,818 | 6/1984 | McCollough et al. | 219/373 |
| 4,707,214 | 11/1987 | Nithart et a l. | 156/392 |

Primary Examiner—David Simmons
Attorney, Agent, or Firm—Bruce A. Kaser

[57] ABSTRACT

A filament and mandrel preheat apparatus is mountable to the payout assembly of a winding machine. The apparatus has heating tubes or electric torches that deliver a heated airflow of variable heat flux into a duct. The exit end of the duct is positioned near the filament and mandrel and preheats it during winding. The duct is rotatable so that the airflow can be directed away from the filament during either a pause or stoppage of winding.

4 Claims, 4 Drawing Sheets

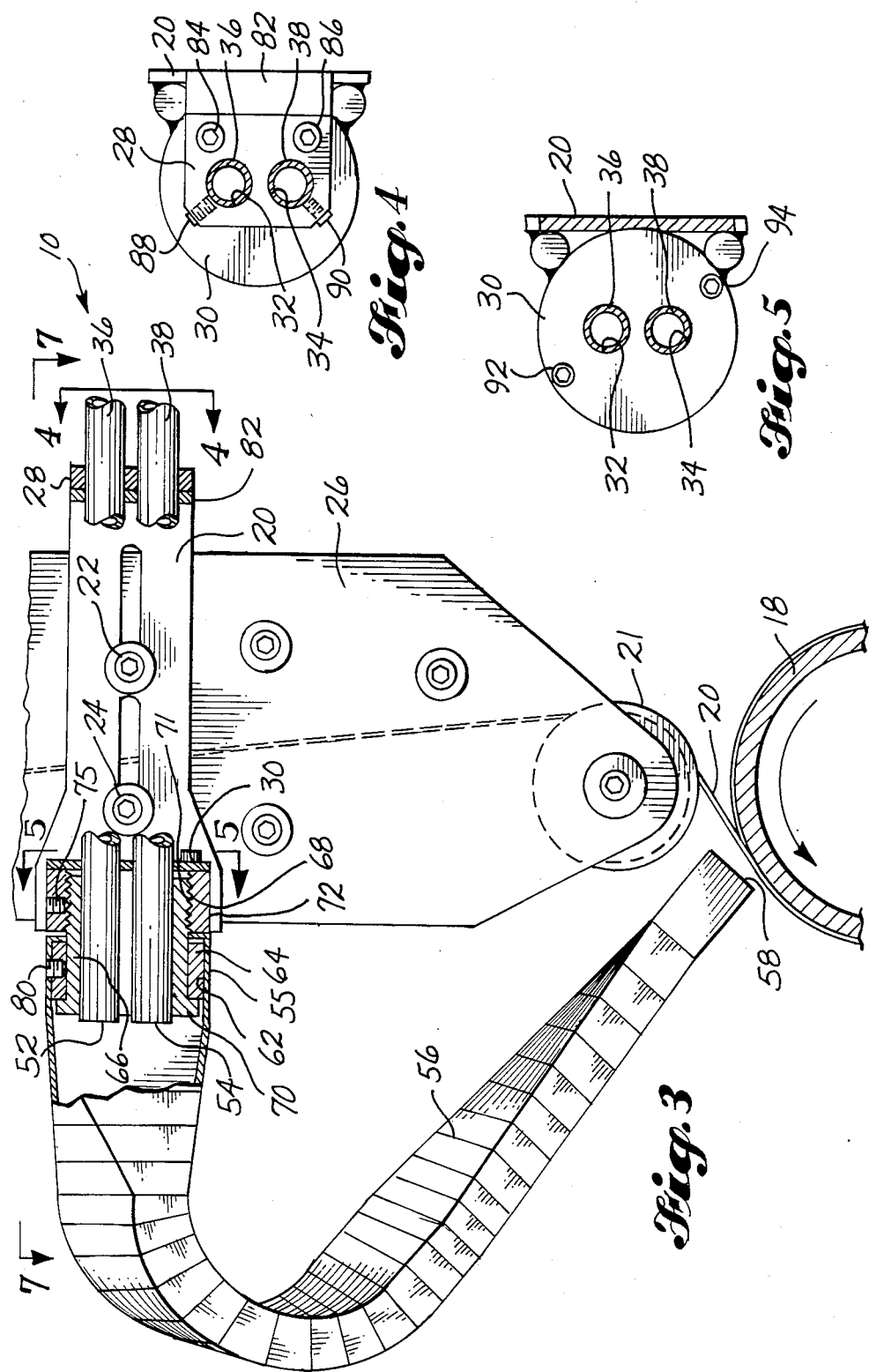

FILAMENT PREHEAT APPARATUS

DESCRIPTION

1. Technical Field

This invention relates to devices which use forced air heat to increase the temperature of certain materials during a manufacturing operation, and more particularly, to devices of this type which preheat resinous filaments or prepregged tapes during a winding process. It is also used to preheat mandrels prior to winding.

2. Background Art

As would be familiar to a person skilled in the art, during a winding process involving preimpregnated or "prepregged" materials, such as resinous filaments, for example, the material is fed from some sort of payout assembly to a mandrel. It is not unusual for both the payout assembly and mandrel to be incorporated into a single winding machine, where the machine's payout portion translates back and forth along the machine's mandrel portion. The mandrel is driven in rotation and this pulls the prepregged material from the payout assembly as it moves. A well-known machine of this type is the ENTEC (trademark) winding machine (Model No. 548 240 4). For informational purposes, this machine is capable of handling winding mandrels up to four feet in diameter and twenty feet in length. Its payout assembly is in the form of a vertical carriage which moves along the length of the mandrel.

When prepregged materials are wound it is generally desirable to preheat both the material and mandrel. Preheating causes better material compaction, which thereby produces a higher quality finished product. In the past, preheating has been accomplished by an operator who manually holds a conventional heat gun near the mandrel at the point of winding. It goes without saying that this procedure has proven extremely monotonous for the operator, especially when a particular winding operation takes a long period of time. Also, manual preheating usually results in a varying heat flux being applied, which can adversely affect the quality of the finished product.

The present invention eliminates these drawbacks by providing a preheat apparatus that is directly mounted to the winding machine's payout assembly. The apparatus of the invention moves along with the payout assembly as it translates, and always delivers a uniform heat flux.

U.S. Pat. No. 3,775,222 issued to Aspin et al. on Nov. 27, 1973 is known to disclose a heat sealing apparatus that generally functions in the same manner as the invention disclosed herein. However, it should be appreciated there are significant differences between the two. Specifically, Aspin does not disclose a heating duct which can be rotated away from the material heated. Further, Aspin discloses a different system for controlling heat flux than that which is utilized by the present invention.

DISCLOSURE OF THE INVENTION

The invention disclosed herein includes heating tubes that generate a heated airflow, a duct for delivering the airflow to the prepregged or winding material, and support structure for mounting both the tubes and duct to a winding machine.

Airflow passing through the tubes is heated and delivered into the airflow end of the duct. The duct is shaped to have both a length and curvature such that its outflow end is positioned next to the winding material and mandrel at the point of winding. The duct is rotatably connected to the mounting structure, such structure being further connected to the winding machine's payout assembly.

The mounting structure includes a support plate or member having brackets at each end which are shaped to form a rack for holding the heating tubes. One bracket, that which is nearest the tube's exit ends, is connected to an annular collar which surrounds the ends. A hollow cylindrical sleeve is in threaded engagement with this collar's inner surface and defines an airflow path from the tubes into the duct's inflow end. The duct is connected to the sleeve by a second collar which surrounds the sleeve's body inbetween its flanged end and the first collar. This latter member, which is fixedly connected to the inner surface of the duct's inflow end, is rotatable about the sleeve and this permits the above-mentioned rotatable duct movement.

The above features, and others, will become clear to the reader upon consideration of the description which follows, when taken in conjunction with the drawings.

BRIEF DESCRIPTION OF THE DRAWINGS

In the drawings, like reference numerals refer to like parts throughout the various views, and wherein:

FIG. 3 is an enlarged side view of the preheat apparatus shown in FIGS. 1 and 2, and shows in cross-section a collar and sleeve construction which rotatably connects a heating duct to a support plate, the latter mounting the preheat apparatus to the winding machine;

FIG. 4 is a side view of a heating tube support bracket and is taken along line 4—4 in FIG. 3;

FIG. 5 is a side view of another support bracket like the bracket shown in FIG. 4, but is taken along line 5—5 in FIG. 3;

BEST MODE FOR CARRYING OUT THE INVENTION

Figure 1:
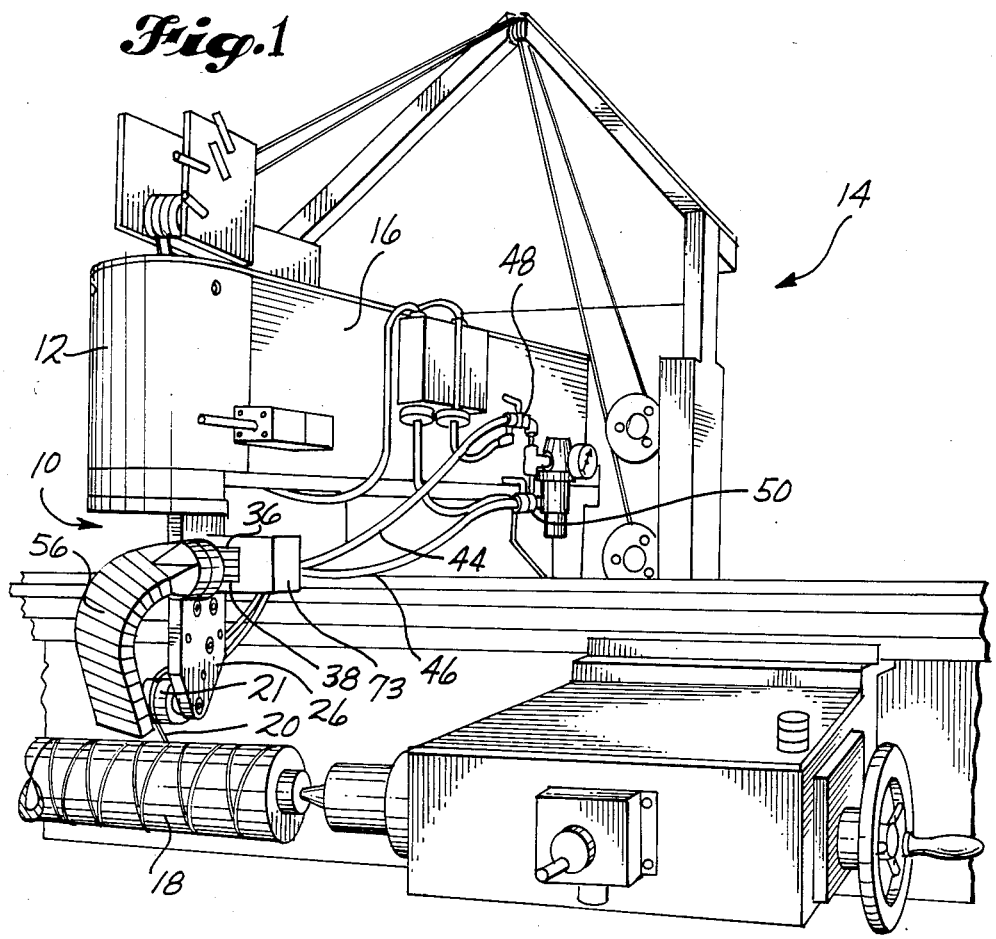
FIG. 1 is a pictorial view of a typical filament winding machine, and shows the machine's vertical carriage supporting a filament payout assembly over a mandrel, and further shows a filament preheat apparatus constructed in accordance with the invention mounted to the payout assembly.

Referring now to the drawings, and first to FIG. 1, therein is shown at 10 a preheat apparatus constructed in accordance with a preferred embodiment of the invention. The apparatus 10 is shown mounted to a filament payout assembly 12 of a conventional filament winding machine 14. By way of example, the winding machine 14 may be a computer-controlled machine such as the previously-mentioned ENTEC (trademark) machine. As would be familiar to a person skilled in the art, this machine's payout assembly 12 is born by a vertical carriage 16, which translates back and forth along the length of a winding mandrel 18. At the same time, a filament 20 is fed from the payout assembly 12 to the mandrel. A rotating spool 21 guides the filament 20 during the winding process.

Drawing reference now to FIG. 3, the apparatus 10 includes a supporting member or plate 20 which is preferably mounted by threaded bolts 22, 24 to a vertical plate 26 on the payout assembly 12. The support plate 20 has heating tube support brackets 28, 30 connected to each end (see FIGS. 4 and 5). These brackets 28, 30 each have a pair of circular openings 32, 34 through which extend a pair of heating tubes 36, 38.

Figure 6:
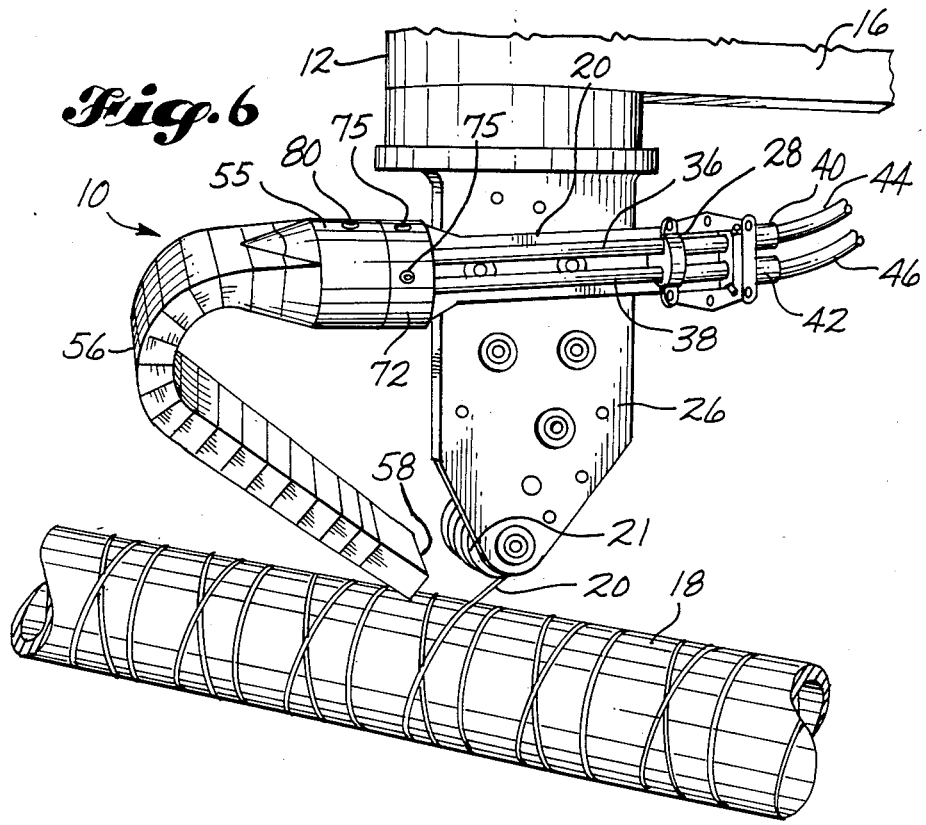
FIG. 6 is a view like FIG. 1 but provides an enlarged pictorial view of of the preheat apparatus.
Figure 7:
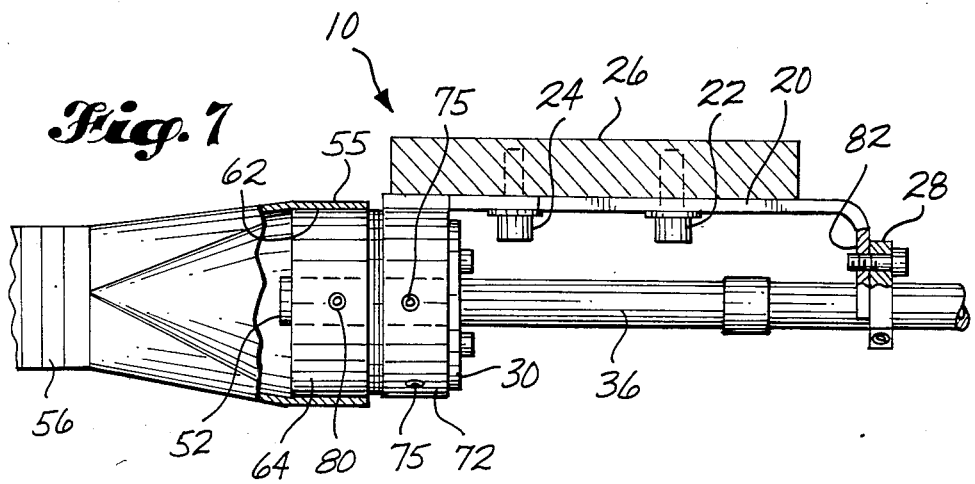
FIG. 7 is a top view of the preheat apparatus shown in FIGS. 1-3 and 6, and is taken along line 7—7 in FIG. 3.

The function and operation of the tubes 36, 38 would be familiar to a person skilled in the art. They are commonly known in the art as "electric torches." In preferred form, they are hollow cylinders which electrically heat air as it passes through them. One end of each tube is connected as shown at 40, 42 (see FIG. 6) to an airhose 44, 46. These provide an airflow which is heated by conventional electrical resistance heating elements in the tubes (these are not shown in the drawings). The hoses 44, 46 are connected to a suitable supply of pressurized air, and airflow through the hoses and, consequently, the heating tubes 36, 38 are regulated by conventional valves 48, 50 that are mounted to the vertical carriage 16.

Each heating tube's other or exit end 52, 54 is positioned just inside an inflow end 55 of an air duct 56. Heated airflow from the tubes 36, 38 is communicated through the duct 56 and exits its second or outflow end 58. This end 58 is normally positioned near the filament 20 and mandrel 18 as shown in FIG. 3.

The brackets 28, 30 provide a rack for holding the heating tubes 36, 38. The inlet 40, 42 and exit 52, 54 ends of the tubes respectively project outwardly away from the bracket which supports each end. Preferably, that bracket 28 which is on the inlet side is fixedly connected to an "L"-shaped flange portion 82 of the support plate 20. This connection is accomplished by threaded bolts or screws 84, 86. The tubes 36, 38 are preferably fixed in the bracket 28 by set screws 88, 90 (see FIG. 4). The other bracket 30 on the exit side of the support plate 20 is preferably not connected directly to the plate. Instead, a first annular-shaped collar 72 is welded directly to that end of the plate 20, and the exit-side bracket 30 is connected to the collar 72 by a pair of threaded bolts or screws 92, 94 (see FIG. 5).

Figure 2:
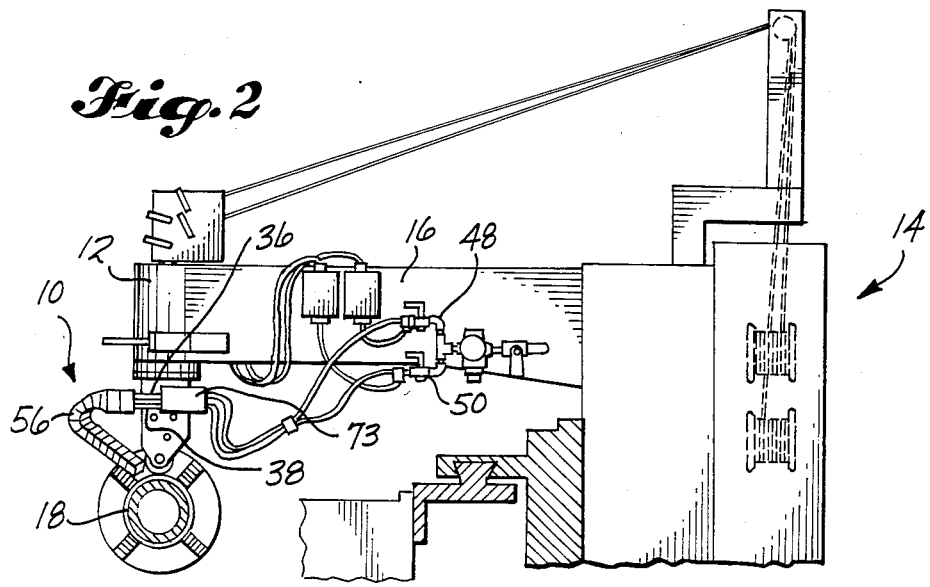
FIG. 2 is a side view of the winding machine and preheat apparatus shown in FIG. 1.

The openings of bores 32, 34 in one bracket are coaxial with respect to the bores in the other. Further, all the bores have the same diameter and are sufficiently large for the heating tubes 36, 38 to be slid therethrough during assembly of the apparatus 10. This construction causes the tubes 36, 38 to be parallel with respect to each other. A suitably protective housing 73, as shown in FIGS. 1 and 2, may be positioned around the heating tubes 36, 38 to prevent direct contact by a machine operator.

As is best seen in FIG. 3, the exit ends 52, 54 of the heating tubes extend through both the collar 72 and a sleeve 66. This sleeve 66 is threaded at one end 68 and flanged at the other 70. Its threaded end 68 is in engagement with complementary threads 71 on the inner surface of the collar 72. In preferred form, the sleeve 66 is fixed against rotation relative to the collar 72 by set screws 75.

The duct's inflow end 55 is preferably cylindrical in shape. Fixedly connected to its inner surface 62 is a second annular collar 64. This second collar surrounds the body of the sleeve 62 and is positioned between the sleeve's flanged end 70 and its threaded end 68. The second collar 64 is rotatable about the body of the sleeve to permit duct rotation.

Figure 9:
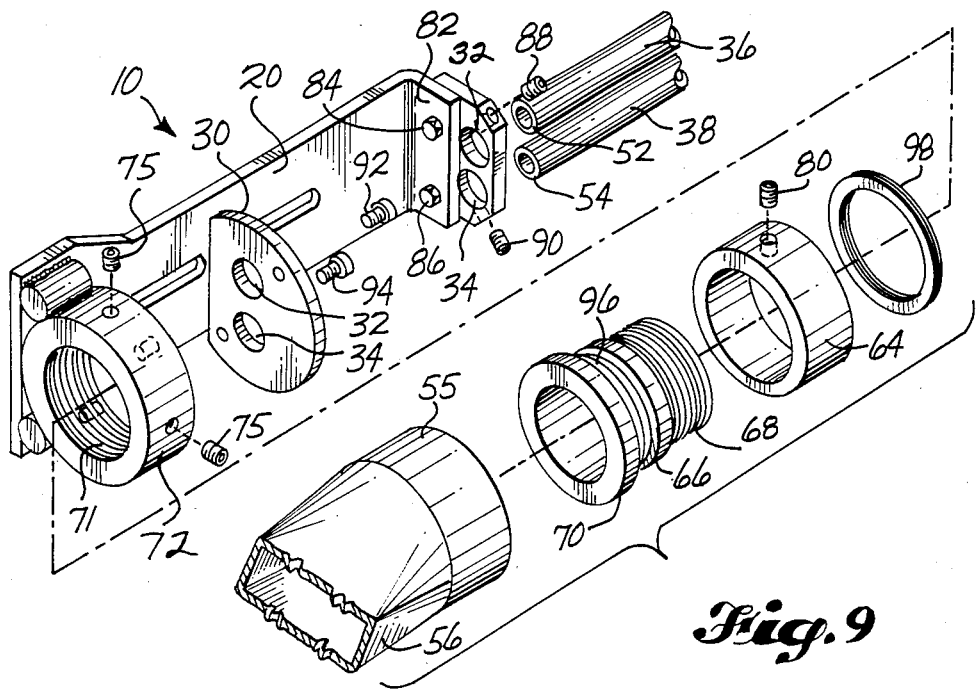
FIG. 9 is an exploded pictorial view of the preheat apparatus shown in FIGS. 1-3, 6 and 8.

If desired, the second collar 64 may be fixed in position by a set screw 80, or the like, which extends through the thickness of both the duct's inflow end 55 and the second collar 64. Preferably, an external groove 96 (see FIG. 9) in the sleeve's body provides a seat for this screw 80 when it is tightened. However, two circular spring washers 98 are also positioned between the second and first collars 64, 72. These act as spacers and normally exert sufficient force against the second collar 64 so that the duct will hold whatever position it has been rotated to without need for tightening screw 80.

Figure 8:
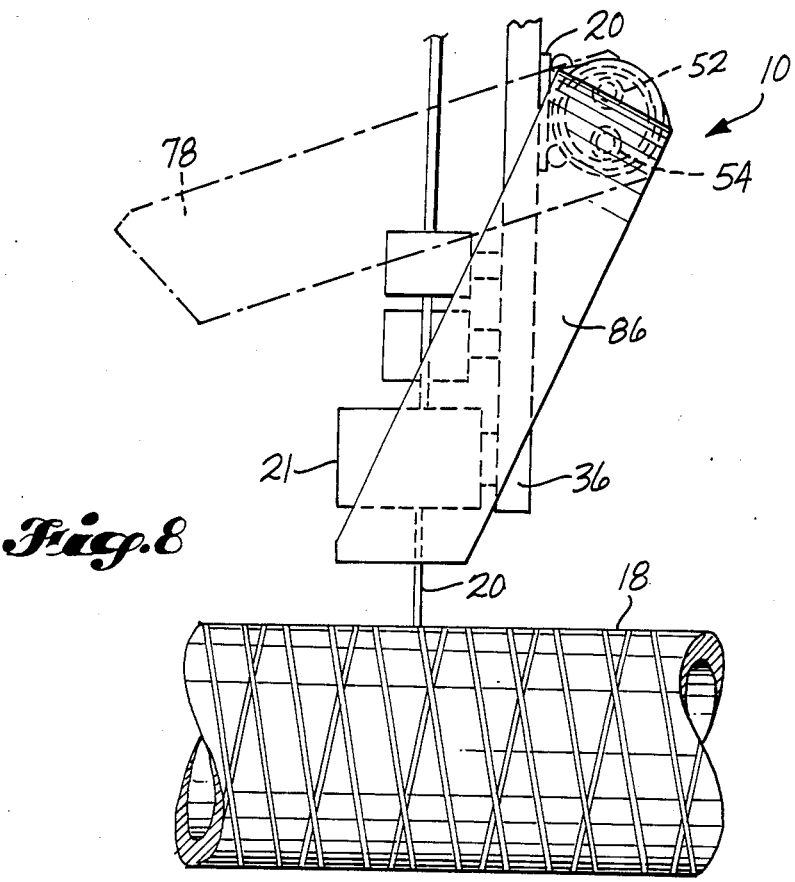
FIG. 8 is a schematic front-end view of the apparatus shown in FIGS. 1-3, 6 and 8, and shows in dashed lines how the apparatus heating duct can be rotated away from a filament.

As mentioned above, the first collar 64 may be rotated around the sleeve 66 which, in turn, rotates the duct 56. This changes the position of the duct's outflow end 58 relative to the filament 20. This is best shown by the dash-dot-dash lines 78 in FIG. 8. During normal filament winding, the duct 56 is in the position shown in FIG. 3. However, it would be undesirable to continue filament preheating if the winding operation was either delayed or stopped and, for this reason, the duct 56 would be rotated.

Having thus described a preferred embodiment of the invention, it is to be appreciated that the above embodiment could be altered in certain ways without departing from the overall spirit and scope of the invention. The invention's application should not be limited to filament winding but winding of any similar prepregged materials. Bearing this in mind, it is not intended that the above description be used to limit the metes and bounds of any legal protection available for this invention. Rather, such protection is to be defined and limited by the patent claim or claims which follow.

What is claimed is:

1. For use in connection with a filament winding machine and the like that has a movable payout assembly for feeding a filament or similar prepregged material to a winding mandrel, an apparatus for preheating said filament and mandrel during the winding process, comprising:

heating means, mounted to said payout assembly, for providing a heated airflow; and an air duct member having an air inflow and an air outflow end, said inflow end being positioned relative to said heating means in a manner so that said heated airflow is delivered into said inflow end, wherein said airflow passes through said duct member and exits through said outflow end, and further, said duct member is shaped so that said outflow end is normally positioned near the location where said filament contacts said mandrel, so that said exiting air is directed against both said filament and mandrel, and still further, said duct member is rotatable about said inflow end, in a manner so that said outflow end may be swung away from said normal position, to direct said exiting airflow away from said filament and mandrel.

2. The apparatus of claim 1, including:

a support member mounted to said filament payout assembly;

a first annular-shaped collar connected to said support member;

a hollow, generally cylindrical sleeve having a first end in threaded engagement with an inner surface of said collar, said sleeve having a second end with an outwardly projecting radial flange portion, said flange portion being axially spaced from said collar; and a second annular-shaped collar connected to said inflow end of said air duct member, said second collar surrounding said sleeve and being positioned inbetween said sleeve's flange portion and said first collar, said second collar being rotatable about said sleeve, for rotating said duct member about said duct member's inflow end.

3. The apparatus of claim 2, including:

at least one spring washer surrounding said sleeve and positioned between said first and second collars, in a manner so as to normally push said second collar axially against said flange portion of said sleeve.

4. The apparatus of claim 2, including first and second bracket members, connected to said support member, and spaced apart from each other, each bracket member having at least one circular bore of a certain diameter, said bore in one bracket member being in coaxial alignment with said bore in said other bracket member, and said diameters of said bores being equal, said heating means including at least one hollow cylindrical heating tube having an air inlet end and an air exit end, said heating tube extending between said bracket members and extending through said bores in each bracket member, in a manner so that said inlet and exit ends of said tube project outwardly from a respective bracket member adjacent each end of said tube, and wherein said first collar is connected to that one of said bracket members which is adjacent said tube exit end, said first collar and said sleeve surrounding said exit end.

* * * * *

UNITED STATES PATENT AND TRADEMARK OFFICE
CERTIFICATE OF CORRECTION

PATENT NO. : 4,797,172

DATED : January 10, 1989

INVENTOR(S) : Michael R. Hebert and Arnold J. Lauder

It is certified that error appears in the above-identified patent and that said Letters Patent is hereby corrected as shown below:

Column 1, line 67,
"airflow" should be -- inflow --.

Signed and Sealed this

Twenty-eighth Day of November 1989

Attest:

JEFFREY M. SAMUELS

Attesting Officer    Acting Commissioner of Patents and Trademarks